(12) United States Patent
Madden et al.

(10) Patent No.: US 11,631,150 B1
(45) Date of Patent: Apr. 18, 2023

(54) PRECIPITATION REMOVAL ANALYTICS

(71) Applicant: Alarm.com Incorporated, Tysons, VA (US)

(72) Inventors: Donald Gerard Madden, Columbia, MD (US); Ethan Shayne, Tysons, VA (US); Daniel Todd Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 423 days.

(21) Appl. No.: 17/003,161

(22) Filed: Aug. 26, 2020

Related U.S. Application Data

(60) Provisional application No. 62/896,974, filed on Sep. 6, 2019.

(51) Int. Cl.
| | | |
|---|---|---|
| *G06Q 50/16* | (2012.01) | |
| *G06V 20/20* | (2022.01) | |
| *G06V 20/10* | (2022.01) | |
| *G06F 18/214* | (2023.01) | |
| *G06K 9/62* | (2022.01) | |

(52) U.S. Cl.
CPC ........ *G06Q 50/163* (2013.01); *G06F 18/214* (2023.01); *G06V 20/188* (2022.01); *G06V 20/20* (2022.01)

(58) Field of Classification Search
None
See application file for complete search history.

(56) References Cited

U.S. PATENT DOCUMENTS

| | | |
|---|---|---|
| 8,428,305 B2 | 4/2013 | Zhang et al. |
| 8,594,936 B1 | 11/2013 | Koval et al. |
| 11,314,046 B2 | 4/2022 | Ma et al. |
| 11,315,046 B1 * | 4/2022 | Cook .............. G06N 20/20 |
| 2011/0128144 A1 | 6/2011 | Baron, Sr. et al. |
| 2014/0324349 A1 | 10/2014 | Agronow |
| 2015/0253463 A1 | 9/2015 | Narayanaswamy et al. |
| 2015/0285952 A1 | 10/2015 | Gupta et al. |

(Continued)

OTHER PUBLICATIONS

A. N. Arslan, C. Melih Tanis, M. Bongio and C. D. Michele, "Estimation Snow Parameters Using Digital Imagery," 2019, IGARSS 2019—2019 IEEE International Geoscience and Remote Sensing Symposium, pp. 3970-3973. (Year: 2019).*

(Continued)

*Primary Examiner* — Sarah M Monfeldt
*Assistant Examiner* — Michael J. Monaghan
(74) *Attorney, Agent, or Firm* — Fish & Richardson P.C.

(57) ABSTRACT

Methods, systems, and apparatus, including computer programs encoded on computer storage media, for performing actions based on predicted precipitation accumulation. One of the methods includes receiving, from a camera, image data that depicts at least a portion of a property; determining, using the image data, a predicted current amount of precipitation that has accumulated at the property; receiving additional data that identifies characteristics of the property; determining one or more actions to remove at least some of the precipitation from the property using the predicted current amount of precipitation that has accumulated at the property, and the characteristics of the property; and performing the one or more actions to remove at least some of the precipitation from the property.

17 Claims, 3 Drawing Sheets

(56) References Cited

U.S. PATENT DOCUMENTS

| | | |
|---|---|---|
| 2015/0309208 A1 | 10/2015 | Sneed et al. |
| 2016/0196688 A1 | 7/2016 | Bergman et al. |
| 2016/0267602 A1 | 9/2016 | Boutin |
| 2016/0300172 A1 | 10/2016 | Bangalore et al. |
| 2017/0161614 A1 | 6/2017 | Mehta et al. |
| 2017/0371074 A1 | 12/2017 | Elkabetz et al. |
| 2018/0372914 A1 | 12/2018 | Yan et al. |
| 2019/0018918 A1 | 1/2019 | Wood et al. |
| 2019/0027255 A1 | 1/2019 | D'amelia |
| 2019/0096217 A1 | 3/2019 | Pouromohammad et al. |
| 2019/0127985 A1 | 5/2019 | Dundorf et al. |
| 2019/0230875 A1 | 8/2019 | Mewes et al. |
| 2019/0361149 A1 | 11/2019 | Fajardo |
| 2020/0309993 A1 | 10/2020 | Ganshin et al. |
| 2021/0270999 A1 | 9/2021 | Bueno Buoro et al. |
| 2022/0122204 A1 | 4/2022 | Ghosh |

OTHER PUBLICATIONS

M. Saleh and G. Faour, "Implementation of an automated snow monitoring system using MODIS products in Lebanon," 2016, 2016 18th Mediterranean Electrotechnical Conference (MELECON), pp. 1-4. (Year: 2016).*

"Apparatus for Machine Learning Snow Blower Assistant", The IP.com Journal, Feb. 22, 2017, https://priorart.ip.com/IPCOM/000249374, pp. 1-3. (Year: 2017).*

* cited by examiner

PRECIPITATION REMOVAL ANALYTICS

CROSS-REFERENCE TO RELATED APPLICATION

This application claims the benefit of U.S. Provisional Application No. 62/896,974, filed on Sep. 6, 2019, the contents of which are incorporated by reference herein.

BACKGROUND

An analytics system can receive image data from a camera and analyze the image data to determine analytics based on the images. For instance, an analytics system can analyze an image to determine an object depict in an image, such as a car or a tree.

SUMMARY

A monitoring system can use video analytics to detect precipitation on a property and actions to perform based on the precipitation. For instance, the monitoring system can receive data from one or more cameras at a property, and optionally data for the property from additional sensors. The monitoring system analyzes the data to determine whether, when, how much, or a combination of these, precipitation might occur at the property.

The monitoring system can use the determination of whether, when, or how much precipitation might occur at a property to perform one or more actions. For example, the monitoring system can use the results of the determination to determine whether to perform an action or to select an appropriate action to perform. The monitoring system can provide an alert or a recommendation to a resident at the property, e.g., a recommended precipitation removal plan. The recommended precipitation removal plan can indicate when the monitoring system recommends removing snow from the property, how the monitoring system recommends removing the snow, e.g., which areas should be cleared before other areas at the property, or both.

The monitoring system can perform one or more automated actions. For instance, when the monitoring system includes one or more automated devices, such as a snow removal robot or a snow melter, the monitoring system can determine whether to use an automated device to remove precipitation and, if so, which automated device to use. The monitoring system can use a predicted amount of precipitation, a predicted type of precipitation, or both, when determining which automated device to use, how many automated devices to use, how to use an automated device for precipitation removal, or a combination of these.

This document generally describes examples of snow removal as a type of precipitation. These examples, when appropriate, can apply to other types of precipitation. For instance, some examples can apply to removal of sleet, hail, or rain in addition to applying to snow. Removal of rain water can include causing the rain water to evaporate, or automatically removing rain water from a sidewalk or a driveway, e.g., to reduce a risk of a person being injured by the rain water. Similarly, removal of hail or sleet can include removal of ice that builds up from either type of precipitation. The monitoring system can select a removal process to conserve energy, e.g., of automated devices that perform the removal, to reduce a likelihood of injury to a person, to reduce a likelihood of malfunction to an automated device, or a combination of these.

In general, one innovative aspect of the subject matter described in this specification relates to video analytics based on snow accumulation, and can be embodied in methods that include the actions of receiving, from a camera, image data that depicts at least a portion of a property; determining, using the image data, a predicted current amount of precipitation that has accumulated at the property; receiving additional data that identifies characteristics of the property; determining one or more actions to remove at least some of the precipitation from the property using the predicted current amount of precipitation that has accumulated at the property, and the characteristics of the property; and performing the one or more actions to remove at least some of the precipitation from the property. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining one or more actions to remove at least some of the precipitation from the property can include providing, to an accumulation model trained using prior predicted and actual amounts of precipitation at the property, the predicted current amount of precipitation that has accumulated at the property to cause the accumulation model to generate a predicted future amount of precipitation that might occur at the property during a time period; receiving, from the accumulation model, the predicted future amount of precipitation that might occur at the property during the time period; and determining the one or more actions to remove at least some of the precipitation from the property using the characteristics of the property, and the predicted future amount of precipitation that might occur at the property during the time period.

In some implementations, the method can include receiving weather forecast data for an area that includes the property. Providing, to the accumulation model, the predicted current amount of precipitation can include providing, to the accumulation model, i) the predicted current amount of precipitation that has accumulated at the property and ii) the weather forecast data for the area that includes the property to cause the accumulation model to generate a predicted future amount of precipitation that might occur at the property during a time period.

In some implementations, determining, using the image data, a predicted amount of precipitation that has accumulated at the property can include providing, to an appearance model trained using historical image data for the property to predict a current precipitation amount, the image data to cause the appearance model to generate the predicted current amount of precipitation that has accumulated at the property; and in response to providing the image data to the appearance model, receiving, from the appearance model, the predicted current amount of precipitation that has accumulated at the property.

In some implementations, receiving the additional data can include receiving the additional data that identifies the characteristics of the property and characteristics of a resident of the property. Determining the one or more actions can include determining the one or more actions to remove at least some of the precipitation from the property using the predicted current amount of precipitation that has accumulated at the property, and the characteristics of the property, and the characteristics of the resident of the property. The characteristics of the resident at the property can include at least one of an amount of precipitation that the resident can remove during a precipitation removal process, a duration for which the resident can remove precipitation, temperatures at which the resident can remove precipitation, two or more durations each of which are for a different temperature range for which the resident can remove precipitation, or a schedule for the resident.

In some implementations, the characteristics of the property can include at least one of an amount of plant cover at the property, an amount of sunlight at the property, potential areas for precipitation removal, a size of the property, a size of a potential area for precipitation removal, whether the property has an automated precipitation removal device, or a relationship between plant cover at the property and a potential area for precipitation removal.

In some implementations, determining the one or more actions to remove at least some of the precipitation from the property can include determining the one or more actions to remove precipitation from a feature at the property using the predicted current amount of precipitation that has accumulated at the property, and the characteristics of the property. Performing the one or more actions to remove at least some of the precipitation from the property can include performing the one or more actions to remove precipitation from the feature at the property. The feature at the property can include one of a sidewalk, a driveway, a patio, a deck, a roof, or a mailbox.

In some implementations, performing the one or more actions to remove at least some of the precipitation from the property can include sending instructions to an automated device to cause the automated device to remove at least some of the precipitation from the property. Performing the one or more actions to remove at least some of the precipitation from the property can include sending instructions to a user device to cause the user device to present a user interface that depicts a recommended snow removal plan.

The subject matter described in this specification can be implemented in various embodiments and may result in one or more of the following advantages. In some implementations, the systems and methods described in this document can reduce energy used to remove precipitation. For instance, the systems and methods can determine an optimized removal schedule based on past, current, and predicted weather to minimize the amount of precipitation removal necessary, e.g., by an automated or manual system, and the amount of energy used for removal. This can include optimizing a removal route, a removal schedule, or both, to reduce energy consumption.

In some implementations, the systems and methods described in this document can improve safety, e.g., of people in an environment monitored by the described systems. For example, the systems described in this document can determine when there is at least a threshold likelihood of risk that a person might be injured by precipitation, precipitation removal, or both, in a monitored environment and cause removal of the precipitation to reduce the likelihood of injury. In some examples, the systems described in this document can reduce a likelihood of injury to a precipitation removal person injury by alerting the precipitation removal person to begin removing precipitation before removal might cause an injury such as heart or back problems.

In some implementations, the systems and methods described in this document can reduce a likelihood of a malfunction in an automated precipitation removal device, reduce power usage by an automated precipitation removal device, increase longevity for an automated precipitation removal device, or a combination of these. For example, the systems and methods described in this document can determine a likelihood that an automated device will malfunction given current sensor data, including weather data. When the likelihood of malfunction satisfies a threshold likelihood, the systems and methods can determine to not send instructions to an automated device to cause the automated device to initiate precipitation removal or to send an instruction to an automated device that is in a precipitation removal process to cause the automated device to stop the precipitation removal process. The instruction can cause the automate device to return to a physical location at which the automated device is less likely to malfunction, e.g., a charging station; to turn off, e.g., when the automated device includes heaters for a sidewalk or a driveway; or both.

The systems and methods described in this document can reduce automated precipitation removal device power usage by optimizing when and for how long an automated precipitation removal device is used. The systems and methods described in this document can reduce power usage by optimizing a precipitation removal path for an automated precipitation removal device. The systems and methods described in this document can increase automated precipitation removal device longevity by reducing wear on the automated precipitation removal device, e.g., during certain weather conditions, such as high or low temperatures. The systems and methods described in this document can reduce usage of precipitation removal products, e.g., salt, reduce wear on surfaces on which precipitation accumulates, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
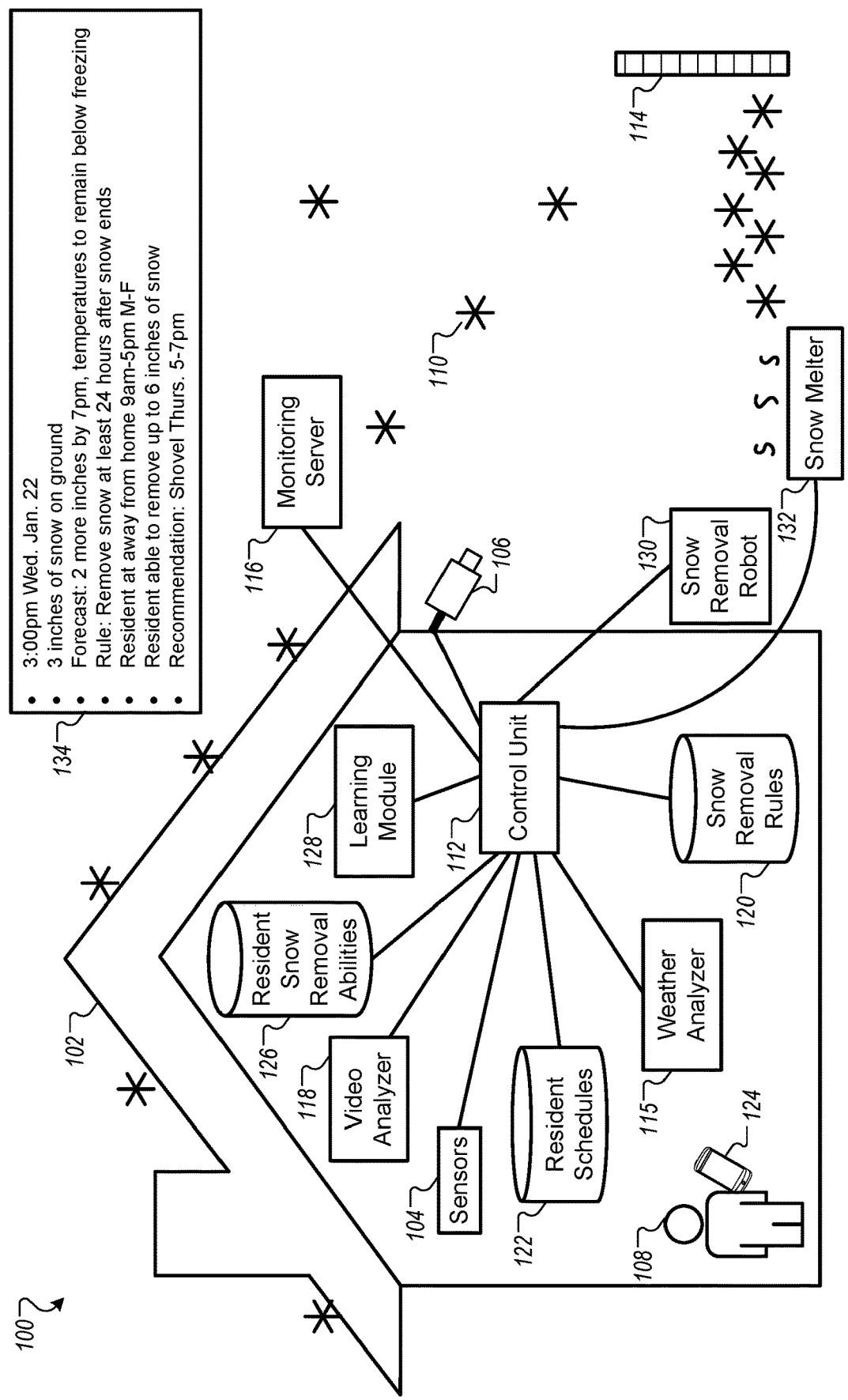
FIG. 1 is an example monitoring system for monitoring snow accumulation.

Precipitation removal, such as snow removal, can involve lengthy and difficult work in the cold, at the least convenient times, and can lead to falls, back injuries, snow blower-based dismemberment, and heart attacks. However, the penalties for not completing the task on time are high and can include frozen snow that is more difficult to remove; slip and fall accidents, with associated liabilities, and municipal fines. A homeowner can hire someone to remove snow, but such services can be in short supply when most needed. If the homeowner is not present, then it can be hard to tell if the job was done in a timely fashion or at all.

The technology described in this document aims to aid the homeowner by optimizing the decision processes related to snow removal. A system can process input from live or recorded video of the property, or both, weather data, pattern-of-life data at the property, and other data to predict a time or times to remove snow, or whether to remove snow at all. The system can predict a time that is least like to interfere with use of the property, that is most likely to optimize use of the property, or both. The system can be used commercially, either by property managers or a snow removal service to optimize the application of resources.

The system may first initialize a learning process. Using installed video cameras, the system can learn the appearance and layout of the property. Scene segmentation techniques are used to identify different types of surfaces, such as pavement, grass, mulch, or other surfaces on which snow or ice would collect. The system can learn the appearance of these surfaces at different times of the year, different lighting conditions, and in different weather. The system models how shadows appear on the surface, and how they relate to the sun position and strength, as well as the objects that might be casting them. For example, as part of the learning process, the system can learn to distinguish between whether a shadow on the driveway is cast by the car parked there temporarily or by a permanent structure. The system can access predicted and current weather data from nearby stations and can use the weather data as part of the learning process. The system can communicate with weather sensors local to the property to get real-time and historic temperature, wind speed, barometer readings, rainfall, etc.

During a snow fall, the system can learn by comparing the reported weather, such as snow fall amount, cloud cover, temperature, wind speed, humidity, snow characteristics, etc., with the appearance of each surface and other data such as altitude, property orientation and location, observed lighting and shadow.

The system may make other observations using video analysis. For example, the system may determine the height of the snow on various surfaces. This could be measured top to bottom on surfaces such as railings or by comparing the top edge of the snow, where discernable, to the location of the object it is resting on, from a reference model. In some examples, the system may detect and estimate the height of drifts in various locations, using, in some instances, a similar procedure. In some examples, the system may learn and be able to identify the appearance of surfaces during and after snow removal and/or snow melt. In some examples, the system may track the application of snow melt on surfaces, as well as amount of snow or rainfall that may wash it away. In some instances, the system may ask a person, e.g., the resident or a snow removal person, to identify the type of snow melt.

During the learning process, the system may identify a snow removal action and may learn several aspects of the procedure. The system may learn the appearance of a surface before and after a snow event. The system may be able to determine the depth of snow at the edge of the snow when some snow has been removed. The system may be able to measure the accumulation rate of snow while it is snowing, before or after or during snow removal. The accumulation rate may be different on different surfaces, in different areas, or both. For instance, snow may accumulate more quickly in an area of a front yard that is not covered by a tree compared to another area of the front yard that is covered by a tree.

The system may be able to assess the quality of the snow removal process. The system may be able to document and learn from which areas snow is generally removed and in which areas snow is typically left. The system may be able to document and assess the application of a snow melt product. The system may be able to document and learn the time required to remove snow from a given area after a given snowfall using a given method.

Given the prior data and observations, the system creates an appearance model that relates the appearance of different surfaces to the amount of snow cover estimated for that area. The system may create a global model based on aggregated and anonymized data and observations. The system can fine tune the global model for a particular region, particular property, particular camera view, particular surface, or a combination of these. Given the global model, the system can look at the current video and estimate the amount of snow on each surface and the time to remove it.

The system can create a local accumulation model that relates the forecasted weather to an amount of snow that has been observed to accumulate on various surfaces. The amounts may be tied to additional variables such as locally measured weather conditions, locally observed sun and shadow, priors such as amount of snow-melt previously applied, etc., or a combination of these. Given the weather forecast and the learned accumulation model, the system can estimate the future state of snow cover on each surface with or without removal.

For example, using data from a live video stream, a system can use an appearance model to estimate that there are currently three inches of powdery snow on the sidewalk. The forecast can indicate a high probability of another inch of snow over the following four hours. while temperatures are trending up and the driveway is in full sun. The system can use an accumulation model to predict that if the user removes snow now, the additional inch will not accumulate, e.g., because the additional inch will melt in the sun. The system can use the accumulation model to predict that if the user does not remove the snow, there will be 3 inches of wet snow heading into night fall, when temperatures are expected to drop, e.g., and that there is a probability that the wet snow will freeze, which snow can be more difficult to remove, have a higher chance of causing an injury, or both.

The system can maintain, in memory, constraints, preferences, or both. The constraints, preferences, or both, can be for a particular property. The system can learn one or both of the constraints or the preferences during the learning process or receive input from a device operated by a user. For instance, the system may collect data related to the maximum depth and/or weight of snow that a given removal method can handle and/or that a given person, e.g., member of the household or removal person, can remove using the method. In some examples, the system may collect data related to how long it takes to clear a given amount of snow. In some examples, the system may collect data related to the household members' schedules, by learning or based on input. These schedules can include when a person shovels show and/or when a person leaves for work. In some instances, the system can collect data related to hard deadlines such as how long the snow can sit before a fine is incurred. In some instances, the system can collect data related to restrictions, e.g., HOA or city restrictions, on use of power equipment. In some examples, the system may collect data related to which surfaces need to be cleared and which ones need not be cleared. Some of the surfaces that need not be cleared can be surfaces that it would be nice to have cleared. In some examples, the system may collect data related to public schedules such as school, government, and/or business operations and closures. The system uses these collected data to evaluate different snow removal scenarios. In some implementations, the system could recommend or determine when to automatically apply, through a robot or another device, snow melt product. The system could determine how much snow melt product to apply given predicted conditions and an assessment of how much snow melt product, if any, is currently on the ground. Doing so can minimize the amount of snow melt product used while increasing a likelihood of maintaining safe walkways.

The system may assign various weights to different parameters. The weights can be based on input received from a device operated by a user, e.g., user preference. The parameters can indicate a cost or other parameters. A cost may be the total effort or energy consumed in the case of a resident removing the snow, or cost of removal in power or dollars. These parameters may take into account conditions that would make removal more difficult such as deep, heavy, or frozen snow. Another parameter may include time spent on the snow removal. Another parameter may include the risk of a person or car traversing slippery pavement or deep snow.

The system may present the user with one or more options that satisfy threshold criteria. The threshold criteria can be a maximum time threshold, a maximum risk threshold, a maximum cost threshold, or a combination of these. The system may send notifications or reminders to make sure a plan for an option is executed on time. The system may include an option to wake up a user up earlier than normal to clear the driveway before they leave for work, e.g., based on analysis performed by the system.

The system may continually reevaluate a recommended option based on analysis of the live video, and update the scenarios as a predicted accumulation changes. Significant changes might trigger additional notifications to the user that the snow removal plan is being altered in a minor or significant way. For example, school may be closed for the day so the resident may no longer have to allow extra time to shovel snow and still make it to school on time.

This system may be useful in various scenarios. In some examples, the resident, or user, may remove the snow using a shovel. Snow begins to fall on Sunday morning. Based on the forecast and the accumulation model, the system notifies the user that they will likely need to shovel their walk by 10 am to minimize risk to pedestrian traffic, to reduce a likelihood of having to shovel snow packed by footprints, or both. The system can determine that new snow should stop falling by 12 pm, and the little that accumulates on the sidewalk after that should be melted by a combination of sunshine and residual snow-melt. If the system determines that the sun is unlikely to melt the accumulated snow, then the system may suggest that the user should shovel the driveway any time between 12 pm, when the snow is likely to stop, and 5 pm. This recommendation may be based on the system receiving information indicating that the user does not plan to leave the house until dinner time. The system continuously evaluates the observed accumulation and the forecast, as well as any snow removal process, to confirm that all changes to the environment substantially align with the system's prediction, e.g., of snow melt, recommendation, e.g., of a snow removal process, or both. When the forecast changes, such that, there's going to be a bit more snow between 12 and 1 pm than the system originally predicted, the system notifies the user that they should probably plan to shovel the walkway a second time at 1 pm, and that they can shovel the driveway any time between finishing the walkway and 5 pm.

In examples of an environment that includes a heated sidewalk, the system can be used to control the sidewalk heating elements directly. The system can analyze the environment that surrounds the heated sidewalk and adjust parameters for the heated sidewalk to minimize energy consumption by the heating elements, reduce risks to pedestrians and motorists who use or are near the heated sidewalk, or both. As part of the process balancing these two potential benefits, the system may attempt to raise the temperature of the sidewalk's upper surface, and the ice/snow contacting the sidewalk's upper surface, as much as necessary to melt the snow. The system might wait until a given amount of accumulation has occurred, and then power on the heating elements. As soon as a given section was observed to be melting past a given threshold, the power to the heating elements for that section may be reduced, e.g., assuming that any water created by the melting snow or ice is no longer on the sidewalk's upper surface. Since snow tends to insulate, the optimal application of energy can leave a small coating of snow on top, while it melts from below, for as long as possible until the snow event ends, then shut off entirely once that coating has melted. The system can maintain the temperature of the sidewalk if an outdoor temperature is forecasted to be below the freezing point after the snow stopped. At this point the system can weigh the cost of keeping the water remaining on the surface just above freezing for the duration of the cold period, or increasing the temperature much higher in the hopes of drying the surface off sufficiently that the system could shut completely off.

In some implementations, the system can initiate a cleaning process. For instance, when the system determines that any snow, ice, or both, that was on the sidewalk is melted, the system can send instructions to an automated device, e.g., a robot, to cause the automated device to substantially remove any water that is on the sidewalk. This can include causing the automated device to mop up the water, or push the water off of the sidewalk, e.g., and onto a lawn adjacent to the sidewalk. In some examples, the system can send instructions to a device that cause the device to present a request for a person to substantially remove any water that is on the sidewalk. Removal of water before it freezes or otherwise becomes a hazard can reduce a likelihood of injury occurring if the water is not removed, reduce an amount of power required to remove the water, e.g., when more power would be required if the water freezes, or both, compared to other systems.

In the case of a third party snow removal service, the system can analyze parameters that include a monetary cost of hiring a contractor at a given time, or multiple times in a longer snow event; a risk to pedestrians and motorists; or both. The system can select a scenario with the lowest cost and lowest risk to find a contractor and schedule them automatically. This could allow the user to get a lower price, or secure snow removal before demand outstrips supply.

This system could also be used by a snow removal contractor to determine the most efficient way to schedule one or multiple clients to minimize time spent at a particular property; to maximize the use of resources, e.g., snow removal resources; to minimize energy consumption, e.g., by vehicles travelling to multiple client sites or used by resources at client sites; or a combination of two or more of these. In some implementations, the system can provide cost estimates in real-time, or power a bidding system for on-demand scheduling during a snow event. The system might include an interface to automate scheduling, leveraging something like an auto-caller to find available contractors. Parts of this system might be provided by the contractors to their regular clients in order to streamline their operations, or the system might be run by the contractors and leverage existing cameras on properties through a video sharing arrangement. In some implementations, the snow removal system could be provided and run independent of snow-removal contractors. This may involve direct communication between the home monitoring system contacting the snow-removal contractors directly, or could rely on mediating tools provided by the back-end servers of the home monitoring system. For privacy, the snow analysis algorithms could run on the edge and report only snow-related data to the contractor, e.g., when property owners have opted in to the process.

Elements of the system can be used to confirm the timely removal of snow by a third party, to notify a user when the snow has accumulated to the point where it is an issue, to notify the user again when it is removed, or a combination of these.

The system can be used to trigger, guide, and optimize an automated system, e.g., a robotic system, for clearing snow, ice, or water, for applying snow melt treatment, or for a combination of these. The costs and constraints can be based on the particulars of the robotic platform, including power consumption, battery life, navigation constraints, etc.

The system may consider other factors and constraints. The system could learn the amount of time required to clear off a car, scrape the windshield, etc. The system can learn which car each user might plan to use, an expected time of use, or both. The appearance model could learn to estimate the amount of snow/ice on each car as it does each surface.

In calculating constraints, the system could use current and historic traffic data to predict how much earlier one might need to leave in the morning to get to a regular destination and factor this into the schedule constraints.

The system can predict when a plow may come based on municipal schedules, observations from other systems, and past observations at this property. The system can notify users before snowfall, before a plow arrives, or both, to move cars, etc. The system could take historical plow impacts into account. In some cases, depending on the amount of snow, the system can generate a recommendation to clear an area around a driveway to minimize the amount of snow piled up by the plow. In some implementations, the system can generate a recommendation after the plow comes in order to reduce a likelihood that a person will need to go out in the snow more than once to clear the driveway, or when a likelihood of vehicle use until the roads are cleared is less than a threshold likelihood.

FIG. 1 is an example monitoring system 100 for monitoring snow accumulation. The monitoring system 100 can provide a user guidance on snow removal at a property 102. In general, the monitoring system 100 collects and analyses data from various sensors 104, including image data collected from a camera 106, to determine an appropriate snow removal action plan. The monitoring system 100 may implement the plan automatically and/or instruct the resident 108 to perform a snow removal action. Although some examples refer to a resident 108, these examples can also apply for other types of users 108, such as a snow removal person or another maintenance person.

In more detail, snow 110 is falling at the property 102 and is collecting on the roof of a house at the property 102 and outside the house at the property 102, e.g., on the house's yard. A control unit 112 unit receives data from various devices to determine an appropriate snow removal action plan. The control unit 112 receives image data from the camera 106. The field of view of the camera 106 may include a reference object 114 that provides a reference to determine the current depth of the snow 110. The reference object 114 can be a ruler, a mailbox, a fire hydrant, or another appropriate reference object. The reference object 114 can be a stationary reference object that does not move, or an object that can move, e.g., a car. In some instances, the control unit 112 may analyze previous image data from the camera 106 to identify objects that may be used to measure snow depth as the reference object 114. For example, the control unit 112 may use a parked car, a retaining wall, or any other object that is typically located in the field of view of the camera 106 to measure snow depth.

In some instances the control unit 112 may include a video analyzer 118 that is configured to analyze the video data received from the camera 106. The control unit 112 can use data received from the video analyzer 118 to determine a reference object, a predicted or actual height for the reference object, or both.

The control unit 112 may receive data from other sensors 104 that are located at the property 102. For example, the control unit 112 may receive temperature data from a thermometer, motion data from a motion sensor that is located at the property, or both. The control unit 112 may be able to identify rooms of the property 102 where there is movement by monitoring data from motion sensors. That movement may correspond to a person. The control unit 112 can use data that indicates movement of a person when generating a snow removal plan, e.g., based on a prediction of when the person might go outside.

The control unit 112 may receive weather data from a weather analyzer 115. The weather analyzer 115 may be integrated with the control unit 112 and/or the monitoring server 116. The weather analyzer 115 may receive weather data for the location of the property 102. The weather analyzer 115 may learn how different surfaces heat and cool in the presence of sun, snow, rain, or any other type of weather by analyzing the weather data, data from the sensors 104, and image data from the camera 106. The weather analyzer 115 may learn how shadows are cast on the property 102 and determine how sun and shadows affect the melting of the snow 110, e.g., during different times of day, seasons of the year, or both.

The control unit 112 may access one or more snow removal rules 120 that include rules related to when, how, or both, snow should be removed from the property 102. For example, the snow removal rules 120 may include rules related to the removal of snow from sidewalks in front of the property 102. A rule may indicate that snow should be removed at least 24 hours after the snow ends. In some implementations, the snow removal rules 120 may be set by the user 108, a property manager, a municipality, a homeowners' association, or any combination of these. For example, if the municipality has a rule to remove snow within twenty-four hours and the homeowners' association requires removal within twelve hours, then the control unit 112 may select the lesser of the two, e.g., removal within twelve hours. The snow removal rules 120 may be dynamically updated over the internet, for example, if the rules or change or there are emergency conditions.

The control unit 112 may access one or more resident schedules 122. The control unit 112 may receive schedule data from the resident 108, e.g., when the resident 108 opts into the process, and store the received schedule data in the resident schedules 122. The resident 108 may enter the schedule data into the user device 124. In some instances, the control unit 112 may learn the resident schedules by monitoring and analyzing the sensor data from the sensors 104 and monitoring and analyzing the image data from the camera 106. For example, the control unit 112 may learn that the resident 108 is generally away from the house between 9 am and 5 pm on Monday through Friday based in a general lack of motion data in the property 102 and corresponding door sensor data.

The control unit 112 may access one or more resident snow removal abilities 126, one or more automated device snow removal abilities, or both. The snow removal abilities 126 may include data that indicates the ability of a resident 108 or an automated device to remove snow. For example, the snow removal abilities 126 may indicate that the resident 108 or the automated device is able to remove at most snow with a depth of six inches. The ability of the resident 108 or the automated device can indicate a duration for which the resident can remove snow, temperatures at which the resident can remove snow, two or more durations each of which are for a different temperature range, or a combination of these.

In some examples, the control unit 112 can use snow removal abilities that account for an estimated wetness, an estimated density, an estimated weight, or a combination of two or more of these. For instance, the control unit 112 can determine that an automated device can likely remove wet snow that is two inches deep or powdery not-damp snow that is six inches deep.

The control unit may receive snow removal ability data from the resident 108, e.g., when the resident 108 opts into the process, through the user device 124. In some instances, the control unit 112 may learn the snow removal ability of an automated device or the resident 108, e.g., when the resident 108 opts into the process, by analyzing the image data captured by the camera 106 to determine how much snow, an estimated snow depth, an estimated snow wetness, an estimated snow density, an estimate snow weight, or a combination of these, the automated device or the resident 108 has previously removed. How much snow can indicate a quantity of snow, such as three cubic feet. In some implementations, the control unit 112 may receive fitness tracker data from a fitness tracker device for the user 108. The control unit 112 may determine snow removal capabilities based on the fitness tracker data.

The control unit 112 may include a learning module 128. The learning module 128 may use machine learning to analyze data received from the sensors 104, the camera 106, as well as other data such as weather data. The learning module 128 may be configured to train the video analyzer 118 to determine the depth of snow 110 in the field of view of the camera 106. The learning module 128 may be configured to train the control unit 112 to determine the resident schedules in instances where the resident does not provide the schedule data.

The control unit 112 can be configured to interface with a snow removal robot 130, a snow melter 132, or both. The control unit 112 may provide instructions to the snow melter 132 on when to activate. The control unit 112 may provide instructions to the snow removal robot 130 on when and where to remove snow 110. For example, the control unit 112 may provide instructions to the snow melter 132 to activate when the video analyzer 118 determines that there is one inch of snow 110 on the ground, e.g., on a sidewalk, a driveway, or both, at the property 102. The control unit 112 may provide instructions to the snow melter 132 to deactivate when the video analyzer 118 determines that the snow 110 has melted. In some examples, the control unit 112 may provide instructions to the snow removal robot 130 to remove snow from a driveway, a sidewalk, or both, at the property 102. The control unit 112 may provide the instruction based on the video analyzer 118 determining that three inches of snow 110 has accumulated on the driveway, on the sidewalk, or both.

The snow accumulation amount can be a predicted maximum amount of snow accumulation, a predicted minimum amount of snow accumulation, or a predicted average amount of snow accumulation. For instance, the video analyzer 118 can determine that there is an average three inch snow depth on the driveway and the sidewalk. In response, the control unit 112 can provide instructions to the snow removal robot 130, the snow melter 132, or both, to cause the corresponding device to remove snow from a surface, e.g., one or both of the driveway or the sidewalk.

An example scenario 134 describes how the control unit 112 can analyze data during a snow event and provide a snow removal plan to the resident 108. In the scenario 134, monitoring system 100 predicts that there are three inches of snow 110 on the ground at 3 pm on a Wednesday. The video analyzer 118 is able to determine the amount of snow on the ground using video analytics on the video data from the camera 106. The weather analyzer 115 receives weather data from the internet or from a monitoring server 116, e.g., connected to the control unit 112 via a network, and determines that two more inches are forecast to fall by 7 pm and temperatures will likely remain below freezing. The control unit 112 accesses the snow removal rule indicating that snow must be removed from the sidewalk within twenty-four hours after the end of the snow.

Prior to the snow event, by analyzing past data from the camera 106 and the sensors 104, the learning module 128 determined that the resident 108 is typically away from the property 102 between 9 am and 5 pm on weekdays. The resident 108 has also indicated that the resident 108 is able to shovel up to a six inch snow depth at one time.

In this scenario 134, the control unit 112 determines that the resident 108 should shovel the snow 110 between 5 pm and 7 pm on Wednesday and provide a recommendation to a user device 124 operated by the resident 108 that indicates the recommended snow shovel plan. This recommendation is based on the abilities of the resident 108, the snow forecast, and the amount of snow 110 on the ground. The control unit 112 can activate the snow melter 132 to remove the snow 110, e.g., instead of or in addition to providing the snow removal recommendation to the user device 124. The snow melter 132 may be installed in all the locations where snow 110 should be removed, e.g., the snow melter 132 can be integrated into the driveway, the sidewalk, or both, such as with heat coils. In some instances, the control unit 112 may dispatch the snow removal robot 130 to the remove the snow 110 instead of or in addition to recommending that the resident 108 remove the snow. When the control unit 112 instructs the snow removal robot 130 to remove the snow and the video analyzer 118 determines, using video analytics, that the snow 110 continues to accumulate, the control unit 112 can determine that the snow removal robot 130 has likely malfunctioned. As a result, the control unit 112 may recommend that the resident 108 remove the snow 110 manually.

In some implementations, the learning module 128, or another component in the monitoring system 100, can include one or more machine learning models. The models can include one or more generic models, an accumulation model, an appearance model, or a combination of two or more of these.

The learning module 128 can use an appearance model to predict current precipitation, e.g., snow, conditions. For instance, the learning module 128 can use an appearance model to predict an amount of snow that is on a surface given various attributes of the property 102, e.g., a predicted current precipitation amount. The attributes can include plant coverage, sidewalk location, driveway location, roof pitch, land slope, property size, region, e.g., within a country or on a planet, temperature, other appropriate attributes, or a combination of two or more of these.

The learning module 128 can train the appearance model to predict a current amount of precipitation that occurred for a property. For instance, the learning module 128 can train a generic appearance model to predict a current amount of precipitation specific to a particular property 102. The learning module 128 can train a regional, global, or otherwise generic appearance model to predict the current precipitation amount for the property 102. In some examples, the learning module 128 can receives a generic appearance model that is specific to the neighborhood, city, or state in which the property 102 is located.

The learning module 128 can train the generic model using sensor data received from the sensors 104. For example, the learning module 128 can train the generic model using video data for the property 102, for properties in an area around the property 102, e.g., in the neighborhood, or both, to create the appearance model for the property 102.

The learning module 128 can receive, from the appearance model, output that indicates a predicted current amount of precipitation. The predicted current amount of precipitation can be an average for the property 102 or multiple values for different parts of the property 102. For instance, the property 102 can include a walkway in the backyard that is partially covered by a tree and a driveway in the front yard that is not covered by any trees. In this example, the learning module 128 can receive a first predicted current precipitation amount for the backyard walkway and a second predicted current precipitation amount for the front yard driveway.

The learning module 128 can provide the output, received from the appearance model, as input to an accumulation model. The learning module 128 can use the accumulation model to predict a future precipitation amount, an action to perform, e.g., a snow or other precipitation type removal plan, or both. The predicted future precipitation amount can be for the entire property 102, or a part of the property 102. For instance, the accumulation model can generate a first predicted future precipitation amount for the walkway in the backyard and a second predicted future precipitation amount for the driveway in the front yard.

When the monitoring system 100 determines two or more predicted future precipitation amounts, each for a different part of the property 102, the monitoring system 100 can use the two or more predicted future precipitation amounts when determining a snow removal route. For instance, when the monitoring system 100 predicts that a driveway will accumulate more precipitation, more quickly than a walkway in the backyard, e.g., which is partially covered by a tree, the monitoring system 100 can determine a snow removal route that first includes the driveway, then includes the walkway. The snow removal route can optionally include the driveway again, depending on a predicted future precipitation amount for the driveway.

When determining the snow removal route, the monitoring system 100 can use an estimated removal duration for the property 102, or a part of the property 102. For example, when the monitoring system 100 estimates that it will take thirty minutes to remove precipitation from a driveway, and an hour to remove precipitation from the walkway, the monitoring system 100 can use the time estimates when creating the precipitation removal route, e.g., and determining whether to include a second cleaning of the driveway after cleaning of the walkway.

The monitoring system 100 can determine a precipitation removal route for a mobile precipitation removal device, e.g., a robot, or a stationary precipitation removal device. The latter can occur when the monitoring system 100 is optimizing energy use for the property 102. For instance, the monitoring system 100 can determine that a stationary precipitation removal device should first clear the driveway, then, while maintaining a minimum amount of energy to a stationary precipitation removal device for the driveway, initiate clearing of the sidewalk, e.g., by a mobile or a stationary precipitation removal device.

The accumulation model can receive, as input, the predicted current precipitation amount, weather data from the weather analyzer 115, data from one or more of the sensors 104, or a combination of two or more of these. The accumulation model can receive, as input, the predicted current precipitation amount and the weather data.

The data from the sensors can include data from sensors other than the cameras for which the appearance model analyzed images to determine a predicted current accumulation amount. In some examples, the data from the sensors can include image data captured by cameras. This can enable the accumulation model to analyze image data for sun and shadow positions, cloud cover, and precipitation drift locations, to name a few examples.

The learning module 128 can train a generic model to create the accumulation model. The generic model can be a generic accumulation model, e.g., separate from a generic appearance model trained for the appearance model described above. The learning module 128 can train the generic model using the predicted current precipitation amount, weather data from the weather analyzer 115, data from one or more of the sensors 104, or a combination of two or more of these. For example, the learning module 128 can train the generic model using data for the property 102, for properties in an area around the property 102, e.g., in the neighborhood, or both, to create the accumulation model for the property 102.

The monitoring system 100 is an example of a system implemented as computer programs on one or more computers in one or more locations, in which the systems, components, and techniques described in this document are implemented. The user device 124 may include personal computers, mobile communication devices, and other devices that can send and receive data over a network. The network (not shown), such as a local area network (LAN), wide area network (WAN), the Internet, or a combination thereof, connects the user device 124, and the monitoring system 100, and optionally the various components within the monitoring system 100 such as the sensors 104, the weather analyzer 115, the monitoring server 116, the video analyzer 118, the learning module 128, the snow removal robot 130, the snow melter 132, and a database, e.g., that stores the snow removal rules, the resident schedules 122, the resident snow removal abilities 126, or a combination of these. The monitoring system 100 may use a single server computer or multiple server computers operating in conjunction with one another, including, for example, a set of remote computers deployed as a cloud computing service.

The monitoring system 100 can include several different functional components, including the sensors 104, the weather analyzer 115, the monitoring server 116, the video analyzer 118, the learning module 128, the snow removal robot 130, the snow melter 132, a database, or a combination of two or more of these. Any of the functional components can include one or more data processing apparatuses. For instance, each of the the sensors 104, the weather analyzer 115, the monitoring server 116, the video analyzer 118, the learning module 128, the snow removal robot 130, the snow melter 132, and a database can include one or more data processors and instructions that cause the one or more data processors to perform the operations discussed herein.

The various functional components of the monitoring system 100 may be installed on one or more computers as separate functional components or as different modules of a same functional component. For example, the sensors 104, the weather analyzer 115, the monitoring server 116, the video analyzer 118, the learning module 128, the snow removal robot 130, the snow melter 132, and a database can be implemented as computer programs installed on one or more computers in one or more locations that are coupled to each through a network. In cloud-based systems for example, these components can be implemented by individual computing nodes of a distributed computing system.

Figure 2:
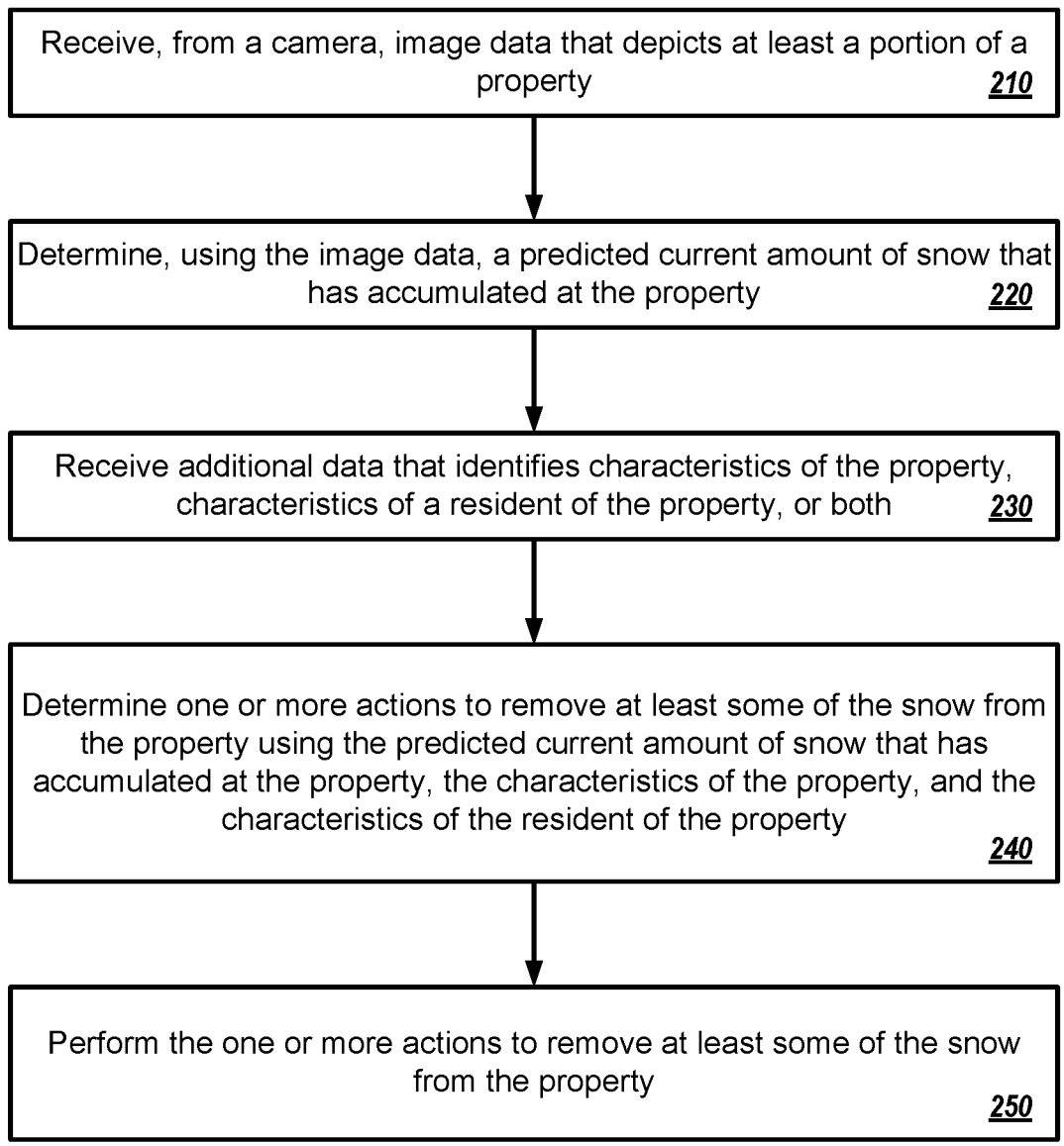
FIG. 2 is an example process for monitoring snow accumulation and providing a user guidance on snow removal.

FIG. 2 is an example process 200 for performing one or more actions to remove some snow from a property. For example, the process 200 can be used by the monitoring system 100 described with reference to FIG. 1.

Although the process 200 is described with reference to snow, a monitoring system can perform the process 200 for other types of precipitation, such as sleet, hail, rain, or a combination of these, potentially in combination with snow. A combination of precipitation types can occur when the monitoring system first detects rain, the rain turns into sleet, and the sleet later turns into snow.

The system receives, from a camera, image data that depicts at least a portion of a property (210). For example, the system can receive a sequence of images from one or more cameras. The cameras can be physically located at the property, in an area around the property, or both. The image data can include an image from the sequence of images or other data that represents an image.

The system determines, using the image data, a predicted current amount of snow that has accumulated at the property (220). For instance, the system can use any appropriate method to determine the predicted current amount of snow. The system can use an appearance model, as described in more detail above, to determine the predicted current amount of snow.

The system receives additional data that identifies characteristics of the property, characteristics of a resident of the property, or both (230). In some examples, the system can receive additional data that identifies either characteristics of the property or characteristics of the resident of the property, but not both. Examples of property characteristics and resident characteristics are described in more detail above. Some resident characteristics can include an amount of precipitation that the resident can remove during a precipitation removal process, a duration for which the resident can remove precipitation, temperatures at which the resident can remove precipitation, two or more durations each of which are for a different temperature range for which the resident can remove precipitation, a schedule for the resident, or a combination of two or more of these.

Some property characteristics can include an amount of plant cover at the property, an amount of sunlight at the property, potential areas for precipitation removal, a size of the property, a size of a potential area for precipitation removal, whether the property has an automated precipitation removal device, a relationship between plant cover at the property and a potential area for precipitation removal, or a combination of two or more of these. One or more of the property characteristics can be for the entire property or a portion of the property, e.g., a patio or a sidewalk. A potential area for precipitation removal can include a sidewalk, a driveway, a deck, a patio, a mailbox, or a roof. A relationship between plant cover at the property and a potential area for precipitation removal can indicate whether a potential area for precipitation removal is at least partially covered by a plant, such as when a tree is above a sidewalk or a mailbox.

The system determines one or more actions to remove at least some of the snow from the property using the predicted current amount of snow that has accumulated at the property, the characteristics of the property, and the characteristics of the resident of the property (240). The one or more actions can include actions for one or more automated precipitation removal devices to perform. For instance, the system can determine a first action for a snow removal robot to perform and a second action for a snow melter to perform. Both actions can be for the same part of the property. Both actions can be for different parts of the property, e.g., a portion of a roof from which the snow melter removes snow and a sidewalk from which the snow removal robot removes snow.

In some implementations, the system can determine one or more recommendation actions for a person to perform for a snow removal process. In these implementations, the actions for the system to perform can include generation of instructions for presentation of a user interface. The recommended actions can indicate recommended times at which areas of the property should be cleared; a recommended snow removal path within an area, through multiple areas, or both; or a combination of these. The system can generate instructions for generation of a user interface that, when provided to a user device, cause the user device to present the user interface that indicates the one or more recommended actions.

The system performs the one or more actions to remove at least some of the snow from the property (250). For example, the system can send instructions to an automated precipitation device to cause the device to remove some or all, e.g., substantially all, precipitation from a portion of the property. The portion of the property can be the potential area for precipitation removal. In some examples, the system can send instructions to the user device to cause the user device to present the user interface that indicates the one or more recommended actions. The presentation can be visible, audible, or both. In some implementations, the system can send instructions to an automated precipitation device and send instructions to the user device.

The order of steps in the process 200 described above is illustrative only, and performing the one or more actions to remove some snow from the property can be performed in different orders. For example, the system can determine the property characteristics and then determine the predicted current amount of snow. In some examples, the system can determine the property characteristics and then receive the image data.

In some implementations, the process 200 can include additional steps, fewer steps, or some of the steps can be divided into multiple steps. For example, the system can determine a likelihood of an automated precipitation removal device malfunctioning. The system can use the likelihood of a malfunction when determining the one or more actions to remove at least some of the snow from the property. For instance, when the system determines that the likelihood of a malfunction satisfies a threshold likelihood, the system can determine to skip causing an automated precipitation removal device to remove some precipitation, e.g., snow, from the property. When the system determines that the likelihood of a malfunction does not satisfy the threshold likelihood, the system can send instructions to the automated precipitation removal device to cause the device to remove some precipitation.

In some examples, the system can determine a likelihood of malfunction while an automated precipitation removal device is currently removing precipitation from a property. The system can perform this analysis using data about the device, such as a temperature or a battery life; data about the property, such as changing property conditions including changing temperatures at the property; or both. When the system determines that the likelihood of malfunction does not satisfy a threshold likelihood, the system can determine to continue with a current precipitation removal process, e.g., the one or more actions determined to remove at least some of the snow from the property. When the system determines that the likelihood of malfunction satisfies the threshold likelihood, the system can send instructions to the automated precipitation removal device to cause the automated precipitation removal device to stop a precipitation removal process. For instance, the system can cause the automated precipitation removal device to return to a charging station, turn off, or both, or otherwise end the precipitation removal process.

When the system determines one or more actions to remove at least some precipitation on a driveway, a sidewalk, a patio, a deck, a roof, or a mailbox, the automated precipitation removal device can be integrated into the driveway, the sidewalk, the patio, the deck, the roof, or the mailbox. For instance, the automated precipitation removal device can include one or more heating elements that is integrated with the corresponding portion of the property, e.g., the sidewalk or the deck. In some examples, the system can remove snow from a roof to prevent the snow from falling down on a person walking below the roof, to reduce a likelihood that snow will freeze, creating a gap between shingles into which later snow melt leaks causing damage to the property, or both.

Figure 3:
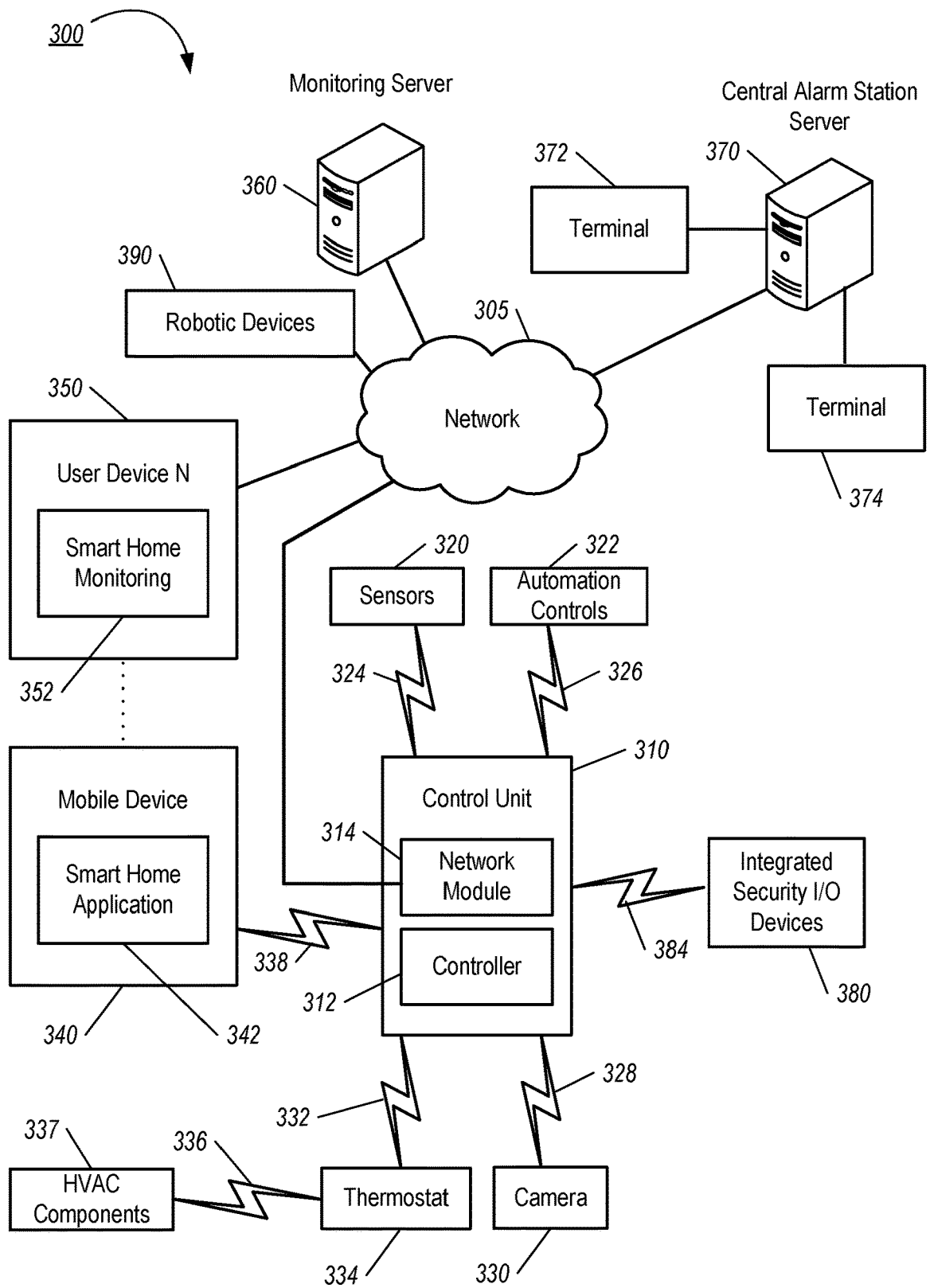
FIG. 3 is a block diagram illustrating an example security monitoring system.

FIG. 3 is a diagram illustrating an example of a home monitoring system 300. The monitoring system 300, e.g., the monitoring system 100, includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, 5G CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 may also include a thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home or outside a home. In these examples, the robotic devices 390 include sensors and control processors that guide movement of the robotic devices 390 within the home or outside the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home or outside the home and guide movement of the robotic devices 390 in a manner that avoids the walls, trees, fences, and other obstacles.

In addition, the robotic devices 390 may store data that describes attributes of the home and the area outside the home. For instance, the robotic devices 390 may store a floorplan, a property map, and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 3 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 108). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, MoCA, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A system comprising one or more computers and one or more storage devices on which are stored instructions that are operable, when executed by the one or more computers, to cause the one or more computers to perform operations comprising:
   receiving, from a camera, image data that depicts at least a portion of a property;
   determining, using the image data, a predicted current amount of precipitation that has accumulated at the property;
   receiving additional data that identifies characteristics of the property;
   providing, to an accumulation model trained using prior predicted and actual amounts of precipitation at the property, the predicted current amount of precipitation that has accumulated at the property to cause the accumulation model to generate a predicted future amount of precipitation that might occur at the property during a time period;
   receiving, from the accumulation model, the predicted future amount of precipitation that might occur at the property during the time period;
   determining one or more actions to remove at least some of the precipitation from the property using the characteristics of the property, and the predicted future amount of precipitation that might occur at the property during the time period; and
   sending instructions to one or more automated devices to cause the one or more automated devices to perform the one or more actions to remove at least some of the precipitation from the property.

2. The system of claim 1, the operations comprising:
   receiving weather forecast data for an area that includes the property, wherein:
   providing, to the accumulation model, the predicted current amount of precipitation comprises providing, to the accumulation model, i) the predicted current amount of precipitation that has accumulated at the property and ii) the weather forecast data for the area that includes the property to cause the accumulation model to generate a predicted future amount of precipitation that might occur at the property during a time period.

3. The system of claim 1, wherein determining, using the image data, a predicted amount of precipitation that has accumulated at the property comprises:
   providing, to an appearance model trained using historical image data for the property to predict a current precipitation amount, the image data to cause the appearance model to generate the predicted current amount of precipitation that has accumulated at the property; and
   in response to providing the image data to the appearance model, receiving, from the appearance model, the predicted current amount of precipitation that has accumulated at the property.

4. The system of claim 1, wherein:
   receiving the additional data comprises receiving the additional data that identifies the characteristics of the property and characteristics of a resident of the property; and
   determining the one or more actions comprises determining the one or more actions to remove at least some of the precipitation from the property using the predicted current amount of precipitation that has accumulated at the property, and the characteristics of the property, and the characteristics of the resident of the property.

5. The system of claim 4, wherein the characteristics of the resident at the property comprise at least one of an amount of precipitation that the resident can remove during a precipitation removal process, a duration for which the resident can remove precipitation, temperatures at which the resident can remove precipitation, two or more durations each of which are for a different temperature range for which the resident can remove precipitation, or a schedule for the resident.

6. The system of claim 1, wherein the characteristics of the property include at least one of an amount of plant cover at the property, an amount of sunlight at the property, potential areas for precipitation removal, a size of the property, a size of a potential area for precipitation removal, whether the property has an automated precipitation removal device, or a relationship between plant cover at the property and a potential area for precipitation removal.

7. The system of claim 1, wherein:
   determining the one or more actions to remove at least some of the precipitation from the property comprises determining the one or more actions to remove precipitation from a feature at the property using the predicted current amount of precipitation that has accumulated at the property, and the characteristics of the property; and
   sending instructions to the one or more automated devices to cause the one or more automated devices to perform the one or more actions to remove at least some of the precipitation from the property comprises sending instructions to one or more automated devices to cause the one or more automated devices to perform the one or more actions to remove precipitation from the feature at the property.

8. The system of claim 7, wherein the feature at the property comprises one of a sidewalk, a driveway, a patio, a deck, a roof, or a mailbox.

9. The system of claim 1, the operations comprising sending instructions to a user device to cause the user device to present a user interface that depicts a recommended snow removal plan.

10. A non-transitory computer storage medium encoded with instructions that, when executed by one or more computers, cause the one or more computers to perform operations comprising:
    receiving, from a camera, image data that depicts at least a portion of a property;
    determining, using the image data, a predicted current amount of precipitation that has accumulated at the property;
    receiving additional data that identifies characteristics of the property;
    providing, to an accumulation model trained using prior predicted and actual amounts of precipitation at the property, the predicted current amount of precipitation that has accumulated at the property to cause the accumulation model to generate a predicted future amount of precipitation that might occur at the property during a time period;
    receiving, from the accumulation model, the predicted future amount of precipitation that might occur at the property during the time period;
    determining one or more actions to remove at least some of the precipitation from the property using the characteristics of the property, and the predicted future amount of precipitation that might occur at the property during the time period; and sending instructions to one or more automated devices to cause the one or more automated devices to perform the one or more actions to remove at least some of the precipitation from the property.

11. The computer storage medium of claim 10, the operations comprising:

receiving weather forecast data for an area that includes the property, wherein:

providing, to the accumulation model, the predicted current amount of precipitation comprises providing, to the accumulation model, i) the predicted current amount of precipitation that has accumulated at the property and ii) the weather forecast data for the area that includes the property to cause the accumulation model to generate a predicted future amount of precipitation that might occur at the property during a time period.

12. The computer storage medium of claim 10, wherein determining, using the image data, a predicted amount of precipitation that has accumulated at the property comprises:

providing, to an appearance model trained using historical image data for the property to predict a current precipitation amount, the image data to cause the appearance model to generate the predicted current amount of precipitation that has accumulated at the property; and in response to providing the image data to the appearance model, receiving, from the appearance model, the predicted current amount of precipitation that has accumulated at the property.

13. The computer storage medium of claim 10, wherein:

receiving the additional data comprises receiving the additional data that identifies the characteristics of the property and characteristics of a resident of the property; and determining the one or more actions comprises determining the one or more actions to remove at least some of the precipitation from the property using the predicted current amount of precipitation that has accumulated at the property, and the characteristics of the property, and the characteristics of the resident of the property.

14. The computer storage medium of claim 13, wherein the characteristics of the resident at the property comprise at least one of an amount of precipitation that the resident can remove during a precipitation removal process, a duration for which the resident can remove precipitation, temperatures at which the resident can remove precipitation, two or more durations each of which are for a different temperature range for which the resident can remove precipitation, or a schedule for the resident.

15. The computer storage medium of claim 10, wherein the characteristics of the property include at least one of an amount of plant cover at the property, an amount of sunlight at the property, potential areas for precipitation removal, a size of the property, a size of a potential area for precipitation removal, whether the property has an automated precipitation removal device, or a relationship between plant cover at the property and a potential area for precipitation removal.

16. The computer storage medium of claim 10, wherein:

determining the one or more actions to remove at least some of the precipitation from the property comprises determining the one or more actions to remove precipitation from a feature at the property using the predicted current amount of precipitation that has accumulated at the property, and the characteristics of the property; and sending instructions to the one or more automated devices to cause the one or more automated devices to perform the one or more actions to remove at least some of the precipitation from the property comprises sending instructions to one or more automated devices to cause the one or more automated devices to perform the one or more actions to remove precipitation from the feature at the property.

17. A computer-implemented method comprising:

receiving, from a camera, image data that depicts at least a portion of a property;

determining, using the image data, a predicted current amount of precipitation that has accumulated at the property;

receiving additional data that identifies characteristics of the property;

providing, to an accumulation model trained using prior predicted and actual amounts of precipitation at the property, the predicted current amount of precipitation that has accumulated at the property to cause the accumulation model to generate a predicted future amount of precipitation that might occur at the property during a time period;

receiving, from the accumulation model, the predicted future amount of precipitation that might occur at the property during the time period;

determining one or more actions to remove at least some of the precipitation from the property using the characteristics of the property, and the predicted future amount of precipitation that might occur at the property during the time period; and sending instructions to one or more automated devices to cause the one or more automated devices to perform the one or more actions to remove at least some of the precipitation from the property.

* * * * *